Figure 1:
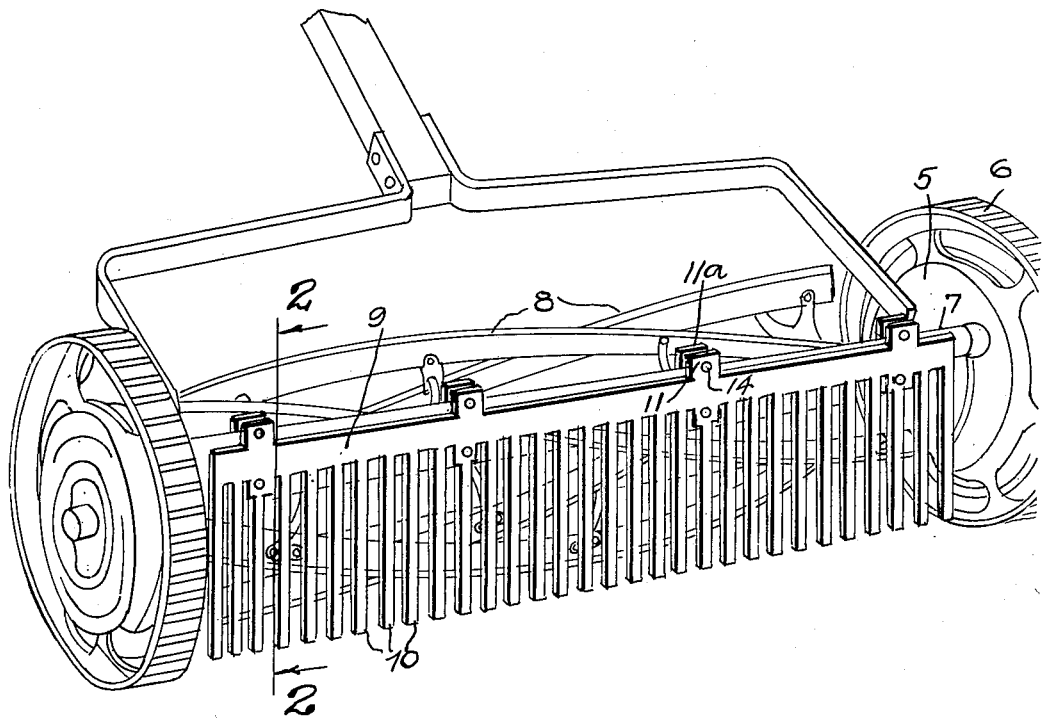

Sept. 16, 1941. L. E. BANGERT 2,256,255
LAWN MOWER ATTACHMENT
Filed Oct. 27, 1939

Lawrence E. Bangert, Inventor

Patented Sept. 16, 1941

2,256,255

UNITED STATES PATENT OFFICE 2,256,255

LAWN MOWER ATTACHMENT

Lawrence E. Bangert, Richmond Hill, N. Y.

Application October 27, 1939, Serial No. 301,664

2 Claims. (Cl. 56—294)

This invention relates to certain new and useful improvements in lawn mower attachments.

The primary object of the invention is to provide a lawn mower with an attachment in the form of a rake or comb located in advance of the cutter blades and bar of the lawn mower and so mounted with respect to the mower that when the latter is in its normal grass cutting position, the lower ends of the tines of the rake or comb are just clear of the ground for ridding the lawn of such weeds as crab grass, also known as finger grass and Polish millet.

A further object of the invention is to provide an attachment of the foregoing character for lawn mowers wherein a rake or comb carried by the frame of the lawn mower forwardly of the cutter blades and bar is disposed perpendicularly to the ground with the tines of the rake or comb being straight throughout their length and resilient to compensate for ground obstructions without injury to the tines, the tines being operative to raise low lying weeds, such as crab grass, from the ground line and allowing them to fall into the path of the advancing cutter blades and bar of the lawn mower.

With the above and other objects in view that will become apparent as the nature of the invention is better understood, the same consists in the novel form, combination and arrangement of parts hereinafter more fully described, shown in the accompanying drawing and claimed.

Figure 2:
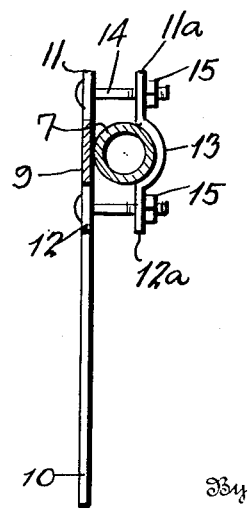

In the drawing:

Figure 1 is a perspective view of the head of a lawn mower equipped with a rake or comb forming the present invention; and Figure 2 is a vertical cross-sectional view taken on line 2—2 of Figure 1.

The lawn mower as shown in Figure 1 is of the usual or standard construction embodying gear housings 5, each of which rotatably supports a ground wheel 6, the gear housings being connected by a bar 7, generally of tubular formation and rearwardly of said bar 7 are the usual rotary cutter blades 8 that are associated with a cutter bar.

The cross bar 7 connecting the gear housing 5 provides a support for the attachment which comprises a rake or comb positioned forwardly of the cutter blades 8. The rake or comb comprises a top strip 9 from which a series of tines 10 depend, the rake or comb being of a length, comparable with the length of the rotary cutter blades 8, while the height of the rake or comb when attached to the cross bar 7 presents the lower ends of the tines 10 in proximity of the ground when the lawn mower is in its normal grass cutting position. While the tines may be of any width desired as well as the spacing thereof, it is preferable to have the tines of one quarter inch width and spaced apart approximately one quarter inch. The tines are straight throughout their length and are resilient and the entire rake or comb may be treated in any manner by any process to render the same rust proof.

To connect the rake or comb to the cross bar 7 of the lawn mower, the top strip 9 is provided with a series of spaced upstanding lugs 11 and a series of depending lugs 12 in vertical alignment with the lugs 11, preferably four sets of lugs being provided and extending respectively above and below the cross bar 7 with the top strip 9 engaged with the cross bar as shown in Figure 2. An anchor strap cooperates with each pair of lugs 11 and 12 and as shown in Figure 2, the anchor strap comprises an intermediate curved or arched portion 13 intimately contacting the cross bar 7 and carrying upwardly and downwardly extending end straps 11a and 12a respectively cooperating with the lugs 11 and 12. Headed screw bolts 14 pass through the lugs 11 and 12 and the end straps 11a and 12a for the reception of retaining nuts 15.

In the operation of the lawn mower with the rake or comb attachment applied thereto, the lower ends of the tines 10 will elevate the seed terminals of weeds such as crab grass and the like to allow them to be caught by the rotary cutter blades and cutter bar of the lawn mower. When the lawn mower has a grass catcher attached thereto, the seed terminals are thrown into the grass catcher and thereby prevent propagation by re-seeding. The comb or rake has a slight scarifying effect on the lawn to promote grass growth. It has been found that when the lower ends of the tines are curved forwardly, such tines frequently prevent forward movement of the lawn mower when obstructions are encountered and sometimes result in breakage of the tines. When the tines are straight throughout their length and resilient to the desired degree, the lower ends of the tines swing rearwardly when an obstruction is encountered on a lawn and pass over such obstruction without injury to the tines, contact of the rotary cutter blades 8 with the rearwardly moved tines tending to restore them to their forward normal perpendicular positions with respect to the ground line.

While there is herein shown and described the preferred embodiment of the invention, it is nevertheless to be understood that minor changes may be made therein without departing from the spirit and scope of the invention as claimed.

I claim:

1. In a rake for a lawn mower, wherein the lawn mower has a connecting bar between the gear housings thereof and wherein rotary cutting blades and a cutter bar are positioned rearwardly of the connecting bar, a rake attached solely to the connecting bar, said rake including a top strip, clamping lugs formed on the top strip at spaced intervals and arranged in pairs with the lugs of each pair respectively projecting above and below the top strip, flat resilient tines depending from the top strip and terminating at their lower ends substantially at the ground line, said top strip adapted to be alined and engaged with the forward side of the connecting bar, and anchor straps engageable with the rear side of the connecting bar and secured to the clamping lugs to hold the rake on the connecting bar of the lawn mower.

2. The combination with a lawn mower having traction wheels and a connecting bar extending between the traction wheels, of a rake attached solely to the connecting bar to rake the ground in advance of the lawn mower, said rake comprising a top strip, pairs of opposed lugs formed on the top strip at spaced intervals with the lugs of each pair respectively extending above and below the top strip, resilient tines depending from the top strip and from the depending lugs and terminating at their lower ends substantially at the ground line, the top strip of the rake being engaged with the forward side of the connecting bar, and anchor straps engaged with the rear side of the connecting bar and secured to the clamping lugs for holding the rake on the connecting bar.

LAWRENCE E. BANGERT.